United States Patent [19]

Soloway et al.

[11] Patent Number: 4,901,277

[45] Date of Patent: Feb. 13, 1990

[54] NETWORK DATA FLOW CONTROL TECHNIQUE

[75] Inventors: Stuart R. Soloway, Wrentham; Bradford R. Steinka, Stoughton; Pierre A. Humblet, Cambridge, all of Mass.

[73] Assignee: Codex Corporation, Mansfield, Mass.

[21] Appl. No.: 144,756

[22] Filed: Jan. 19, 1988

Related U.S. Application Data

[63] Continuation of Ser. No. 777,078, Sep. 17, 1985, abandoned.

[51] Int. Cl.[4] ................................................. G06F 5/06
[52] U.S. Cl. .................................. 364/900; 364/919.4; 364/939.4; 364/929
[58] Field of Search ... 364/200 MS File, 900 MS File; 370/53, 54, 60, 94

[56] References Cited

U.S. PATENT DOCUMENTS

| | | | |
|---|---|---|---|
| 3,200,192 | 8/1965 | Auwaerter et al. | 364/900 |
| 3,749,845 | 7/1973 | Fraser | 364/200 X |
| 4,156,798 | 5/1979 | Doelz | 364/200 X |
| 4,476,527 | 10/1984 | Clayton, IV | 364/200 |

FOREIGN PATENT DOCUMENTS 2022373 12/1979 United Kingdom .
8502963 7/1985 World Int. Prop. O. .

OTHER PUBLICATIONS

CCITT Recommendation X.25.

Primary Examiner—Thomas M. Heckler
Attorney, Agent, or Firm—Fish & Richardson

[57] ABSTRACT

Data flow in a communications network is controlled by a downstream node specifying the maximum average speeds of a plurality of data streams sent from an upstream node on a plurality of data paths.

22 Claims, 5 Drawing Sheets

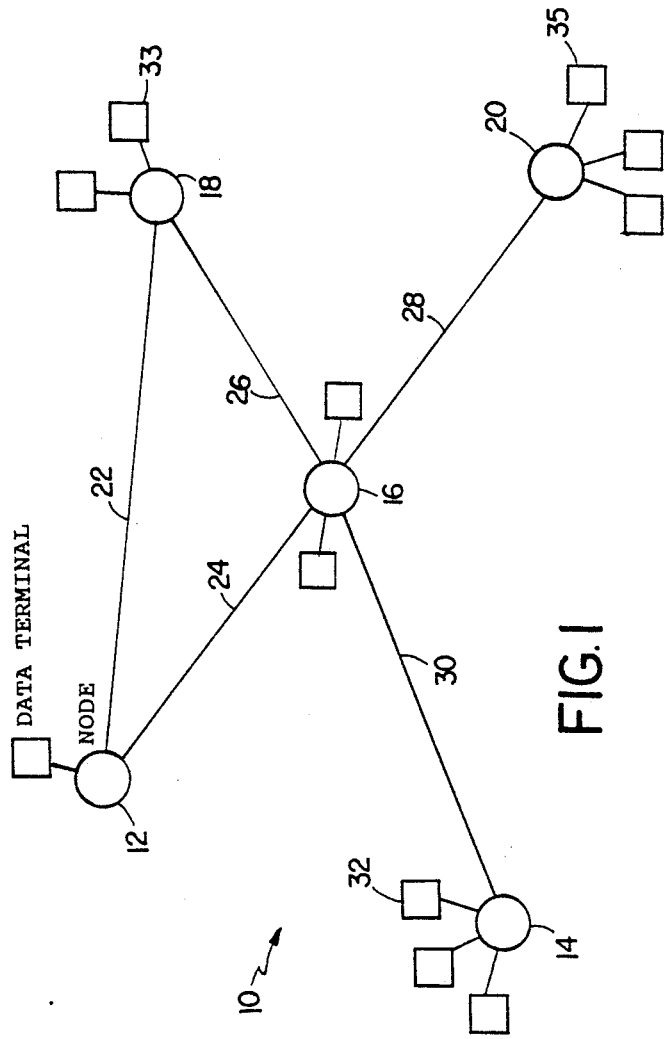

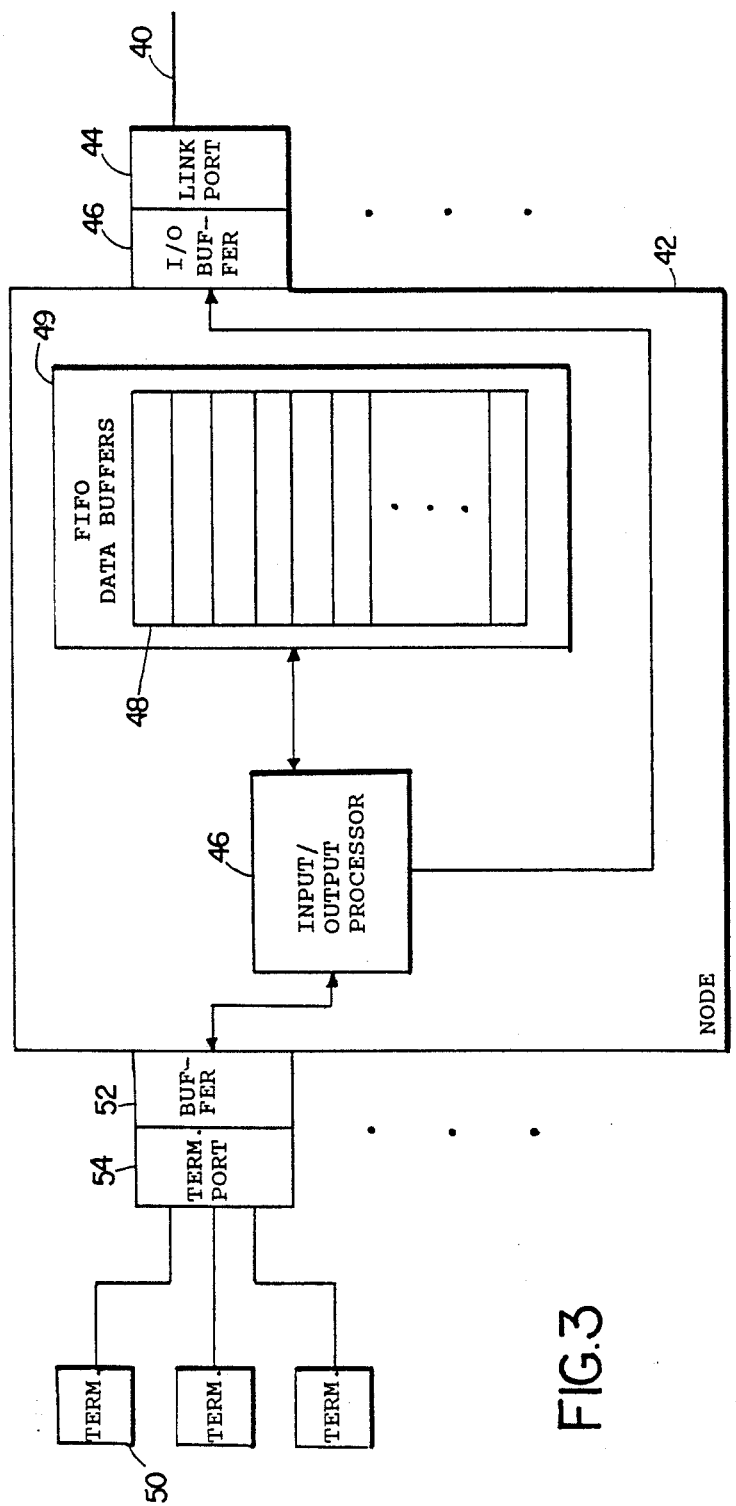

MAXIMUM INTERVAL TABLE

| BUFFERS USED PERCENTAGE | MAXIMUM INTERVAL SPEED-UP TIMER | MAXIMUM INTERVAL SPEED DOWN TIMER |
|---|---|---|
| 0 - 10% | 1 | 10 |
| 10 - 20% | 1 | 10 |
| 20 - 30% | 2 | 9 |
| 30 - 40% | 3 | 8 |
| 40 - 50% | 4 | 6 |
| 50 - 60% | 5 | 5 |
| 60 - 70% | 6 | 3 |
| 70 - 80% | 8 | 2 |
| 80 - 90% | 10 | 1 |
| 90 - 100% | 10 | 1 |

FIG.5

FLOW CONTROL TABLE ~68

| BUFFERS USED PERCENTAGE | LOW THRESHOLD | CHANGE FACTOR | HIGH THRESHOLD |
|---|---|---|---|
| 0 - 10% | .05 | 10.0 | 1.00 |
| 10 - 20% | .20 | 3.0 | 1.20 |
| 20 - 30% | .70 | 1.0 | 1.35 |
| 30 - 40% | .80 | 1.0 | 1.50 |
| 40 - 50% | 1.00 | 1.0 | 2.00 |
| 50 - 60% | 1.00 | 1.0 | 5.00 |
| 60 - 70% | 1.00 | 1.0 | 7.00 |
| 70 - 80% | 1.00 | 1.0 | 10.00 |
| 80 - 90% | 1.00 | 1.0 | 10.00 |
| 90 - 100% | 1.00 | 1.0 | 10.00 |
| 77 | 100 | 80 | 101 |

FIG.6

NETWORK DATA FLOW CONTROL TECHNIQUE

This is a continuation of co-pending application Ser. No. 777,078 filed on Sept. 17, 1985, now abandoned.

BACKGROUND OF THE INVENTION

This invention relates to controlling the flow of data among the nodes of a data communication network.

Two data terminals connected respectively to two different nodes of such a network communicate, in one typical scheme, via a so-called virtual circuit data path that passes through the two nodes and via a chain of intervening nodes and physical links that together complete the connection between the two data terminals. Each node or link may handle a large number of paths. The paths are multiplexed on the link. Each node has buffers that temporarily store inbound data of various paths until it can either be sent out along the outbound links of the respective paths or delivered to data terminals served by that node. The average rate at which inbound data is received cannot exceed the rate of outbound data for very long without the buffers overflowing and data being lost.

One technique for controlling the flow of data in such a network is called an ARQ window. In such a scheme a node receiving data over a path from an upstream node must periodically acknowledge receipt of blocks of data before the upstream node will send more. A maximum number of unacknowledged frames (the ARQ window) can be on the path at one time. The receiving node can thus regulate the quantity of data received over a given path by acknowledging or not acknowledging incoming frames.

SUMMARY OF THE INVENTION

A general feature of the invention is controlling the flow of data in a communications network of the kind in which a plurality of data streams are sent respectively via a plurality of data paths from an upstream node to a downstream node, by having the downstream node specify the maximum average speeds of data streams on the respective paths. As a result each node can directly dictate the speeds of data streams on inbound data paths, reducing loss of data.

Preferred embodiments of the invention include the following features. The downstream node has buffer means for temporarily storing the data streams, the current utilization of the buffer means is measured, and the speeds are specified based on the utilization. A determination is made of the time when speed changes should be considered, and data paths whose speeds are to be changed are identified, thus enabling the necessary changes in the aggregate inbound data rate to be made on the most appropriate paths. The decision of when to consider speed changes itself depends on buffer utilization and on how long ago speed changes were considered; thus changes are considered only as frequently as is appropriate in view of how heavily the buffer is being used. The buffer means includes a plurality of buffers and the buffer utilization is measured as a percentage of the buffers that are being used, a simple and highly relevant criterion. Increases and decreases in speed are considered separately based on buffer utilization and on how long ago speed increases or decreases respectively were considered, thus enabling some path speeds to be increased and others to be decrease at the same time to efficiently manage the buffer utilization. Speed increases or decreases are considered when the previous consideration of speed increases or decreases respectively occurred longer ago than a predetermined amount of time (whose magnitude varies directly with utilization of the buffer, in the case of the decision to consider speed increases, and inversely with the buffer utilization for speed decreases); thus speed increases are considered infrequently when the buffer utilization is high and speed decreases are considered infrequently when the buffer utilization is low. A data path is picked for a speed increase or decrease based on whether the ratio of that path's previously specified speed to a so-called ideal speed exceeds respectively a high or low threshold that varies with buffer utilization. Each threshold increases with higher buffer utilization, so that the higher the buffer utilization the smaller the previously specified speed must be relative to the ideal speed in order to trigger a speed change. The threshold for speed decreases never exceeds unity; the threshold for speed increases never falls below unity; thus speed decreases will never be triggered for a path unless its most recently specified speed is above the ideal speed. The new speed for a path is equal to the ideal speed times a factor no smaller than unity, the factor being a value that varies inversely with buffer utilization; as a result, for very low utilization, the new speed will be higher than the ideal speed. The ideal speed is based on the previous speed set for the path by a node further downstream, on the maximum bandwidth available for the path, and on the utilization of the buffers allocated to a given path. If that utilization exceeds two minutes worth of data bytes at the unadjusted ideal speed, the ideal speed is reduced. The downstream node communicates the speeds to the upstream node, thus enabling the downstream node to effectively control its own buffer utilization.

Other advantages and features will become apparent from the following description of the preferred embodiment, and from the claims.

DESCRIPTION OF THE PREFERRED EMBODIMENT

We first briefly describe the drawings.

Drawings

FIG. 1 is a block diagram of a data communication network;

FIG. 2 is a format diagram of a scan;

FIG. 3 is a block diagram of a node;

FIG. 5 is a table of maximum timer intervals for various buffer utilizations;

FIG. 6 is a flow control table;

FIG. 7 is a format diagram of a set speed message.

Structure

Figure 4:
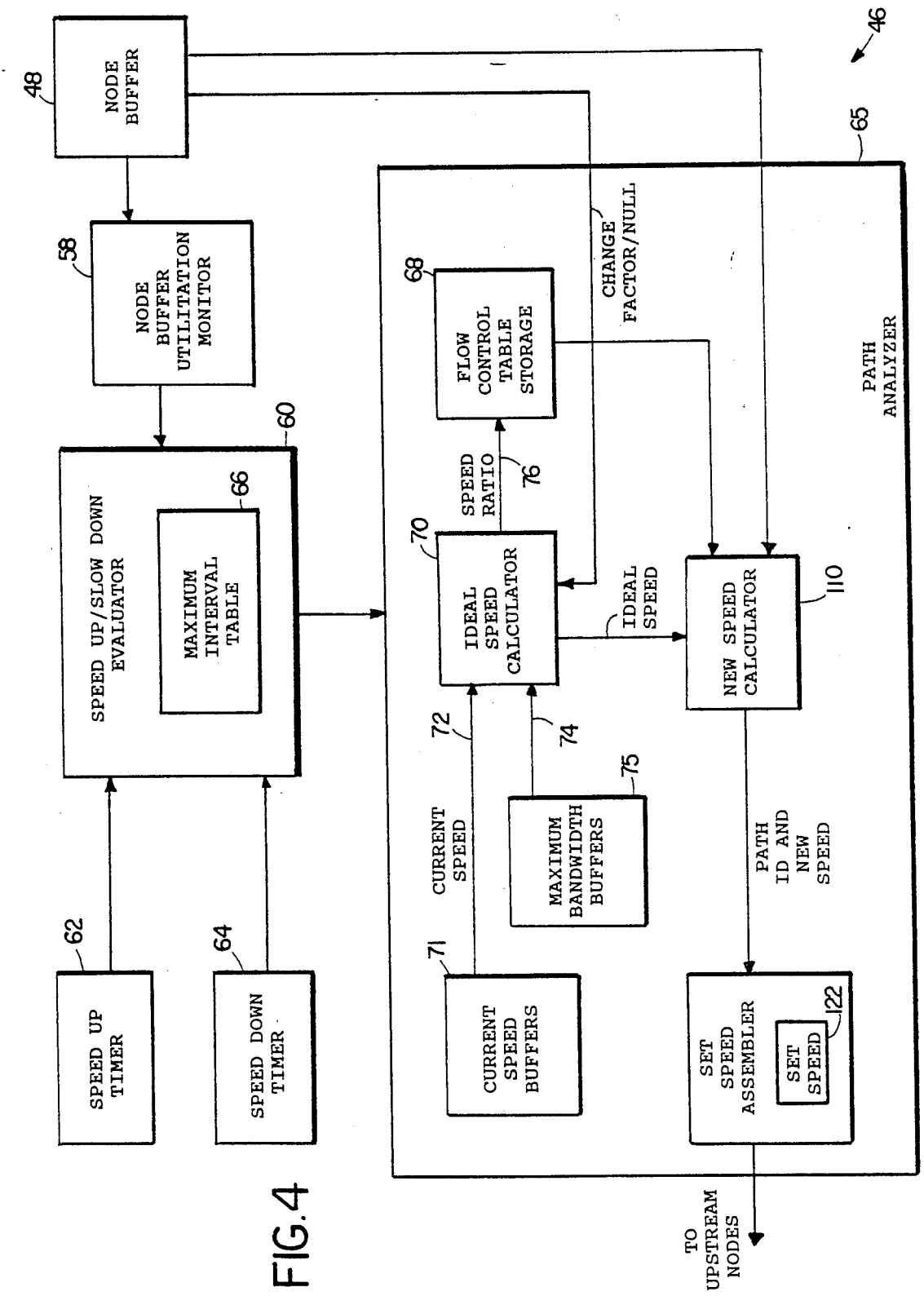
FIG. 4 is a block diagram of an input/output processor of a node.

Referring to FIG. 1, data communication network 10 include nodes 12, 14, 16, 18, 20 interconnected by data links 22, 24, 26, 28, 30. Each node serves one or more data terminals 32. Data flows from a first terminal to a second terminal over a preestablished virtual circuit data path that includes the nodes which serve the two terminals and some combination of intervening links and nodes necessary to complete a physical connection between the two terminals. For example, a path may be established from terminal 33 to terminal 35 via node 18, link 26, node 16, link 28, and node 20. Data paths are created or terminated from time to time according to need. Multiple data paths are multiplexed onto each physical data link.

Referring to FIG. 2, to accomplish the multiplexing each link carries a succession of scans. Each scan is a series of 8-bit bytes arranged in fields including a scan initiator field 34 which uniquely marks the beginning of the scan. The remaining fields of the scan alternate between two types called deltas 36 and slots 38. Each scan potentially includes a slot 38 for each path currently established on that link. For example, slot 1 in successive scans together make up a particular path on the link and can carry a stream of data bytes.

Each slot has a variable number of data bytes, so that the relative maximum average rates at which data bytes of different paths can be carried on the link is determined by the relative maximum numbers of data bytes (called slot weights) in the respective slots. The absolute rates at which data streams can be carried on a path also depend on the total length of each scan and the bit rate of the link. The speeds at which various paths can carry data can be changed by the upstream node reconfiguring the relative slot weights. The scan rate is no higher than a predetermined maximum rate and the scan rate changes as the slot weights change. Each slot has a maximum slot weight.

Although a given path has a certain speed at a particular time, the upstream terminal for the path may not be using the path at that time. If, when a scan is being assembled for transmission, an established path is not in use the slot corresponding to that path is omitted from the scan to save bandwidth. Each delta indicates how many, if any, slots have been omitted between two consecutive slots that are in the scan.

Referring to FIG. 3, a link 40 is connected to a node 42 via a link port 44 and an I/O buffer 46. The scans are carried on link 40 using an HDLC link layer protocol that is handled by link port 44 so that the HDLC protocol is transparent to buffer 46, which deals only with the bytes of the scan. Buffer 46 serves as a temporary buffer for incoming and outgoing data bytes. Node 42 includes an input/output processor (IOP) 46 that gets each incoming byte from buffer 46 and, in the case of a data byte of a slot, puts the data byte into a 32-byte long FIFO data buffer 48 that has been assigned to the path corresponding to that slot. A pool of 2000 FIFO data buffers 48 together make up a node buffer pool 49, which has a finite capacity. Data buffers 48 are allocated dynamically to the needs of the respective paths. If all of the buffers allocated to a given path are full when another data byte arrives on that path, another buffer, if available, is allocated to that path. The addresses of the buffers presently allocated to a path are kept as a linked list.

Periodically, the IOP removes data bytes waiting in the respective data buffers. In the case of data bytes intended for delivery to another node, the IOP inserts the data bytes into the appropriate slots of scans and delivers the scans to the appropriate link port (only one of several of which are shown in FIG. 3). Data bytes intended for a terminal 50 served by the node are passed via a buffer 52 and a terminal port 54 which handles the protocol used between the node and the terminal. If removing a data byte from a given buffer 48 leaves that buffer empty, it becomes freed up for reallocation to another path.

The flow of data bytes into node 42 via links from upstream nodes is regulated in the following way in order to effectively use the available capacity of buffers 48 without unnecessarily discarding data.

Referring to FIG. 4, IOP 46 contains a data buffer utilization monitor 58 which every two seconds looks at node buffer 49 and determines buffer utilization as the percentage of buffers 48 that are currently not empty. Based in part on this determination, a speed up/slow down evaluator 60 decides whether the individual paths should be examined and a number of them selected for which the incoming data rate from the upstream node should be slowed, or accelerated, or no action should be taken. A speed up timer 62 and a slow down timer 64 respectively keep track of the amounts of time which have elapsed since the last time consideration was given respectively to speeding up or slowing down the inbound data speed on any path. A maximum interval table 66 in evaluator 60 relates the percentage of buffers 48 currently being used (i.e., not empty) to the maximum elapsed times on timers 62, 64 before speeding up or slowing down should be considered.

Referring to FIG. 5, maximum interval table 66 contains, for each successive range of 10 percent in the buffer used percentage, the maximum intervals which may elapse on each of timers 62, 64 without analyzing paths to determine whether they should be sped up or slowed down, respectively. For example, given a buffer filled percentage of 35 percent, if the value of the speed up timer exceeds three seconds an analysis will be made of each path as to whether its inbound data rate, expressed in bytes per second, should be increased. If the values of both timers exceed the intervals in their respective columns in table 66, both analyses are made for each path. The maximum interval for the speed up timer increases with higher buffer used percentages, and conversely for the slow down timer. Therefore, when the buffer is almost full, speeding up is considered relatively infrequently while slowing down is considered relatively frequently.

Referring again to FIG. 4, once a decision to evaluate paths has been made, evaluator 60 triggers a path analyzer 65 which considers individual paths for speeding up or slowing down as the case may be, based on the path s ideal speed and a flow control table 68.

Path analyzer 65 includes an ideal speed calculator 70 that calculates an ideal speed 67 for each path based on the most recently specified (current) speed 72 specified for data leaving the node on an outbound leg of the path as found in current speed buffers 71, and the maximum outbound bandwidth 74 available to the path, derived from maximum bandwidth buffers 75.

One of two formulas for the ideal speed is applied by calculator 70; the determination of which formula will be used is based on whether or not more than two seconds worth of outgoing data for that path is currently buffered. Ideal speed calculator 70 watches the utilization of each path's buffers 48. While the path's buffers hold less than two seconds worth of outgoing data at the unadjusted ideal speed, the ideal speed is updated to the highest speed at which data can be transmitted to the down stream node, i.e., ideal speed equals the minimum of the previously set speed or the maximum bandwidth.

When more than two seconds worth of outgoing data for a path (at the unadjusted ideal speed) has accumulated, data is being received faster than node 42 can retransmit it to a downstream node or deliver it to a terminal 50. It is therefore desirable to reduce the rate at which data arrives for that path at node 42 by 50 percent. In that case ideal speed 67 is updated to be equal to one-half of the minimum of the current rate or the maximum bandwidth.

Once the ideal speed 67 has been updated, calculator 70 calculates a speed ratio 76 which is the ratio of the updated ideal speed to the most recent inbound speed 72. If this ratio is less than 1.0, it indicates that data can be accepted from the upstream node at a higher rate; if the ratio is greater than 1.0, it indicates that data is arriving at too great a rate.

Referring to FIG. 6, flow control table 68 is a static table which, based on the speed ratio 76 and the buffers used percentage 77, specifies whether the path associated with a given speed ratio should be selected for speeding up or slowing down and, if it is selected, provides a change factor 80 by which the ideal speed for the given path is multiplied to arrive at the new incoming speed for that path. Two columns 100, 101 contain threshold ratio values for use respectively in making speed up or slow down decisions. The low threshold values 100 are used when selecting paths to slow down. If for a given buffers used percentage, the speed ratio 76 is less than the corresponding low threshold value 100, the path will be selected, otherwise it will not. As the buffer filled Percentage decreases, the speed ratio must be increasingly smaller to trigger an incoming data flow reduction. For example, a speed ratio of 0.9 will cause a path to be selected for slowing down if the buffers are 80% used. If, however, the buffers are only 8% used, the speed ratio must be less than 0.05 to trigger slowing down.

The high threshold values 101 are applied when paths to be sped up are being selected. If a given speed ratio is higher than the high threshold level indicated for the current buffers used percentage the path will be selected. As the buffers used percentage increases, the speed ratio must be increasingly greater than 1.0 for the path to be selected.

Referring again to FIG. 4, to obtain the proper change factor, calculator 70 applies the speed ratio 76 to storage 68 which then passes to a new speed calculator 110 either the indicated change factor or a null value. A change factor indicates that the path currently under evaluation has been selected for a speed change. A null value indicates that the path has not been selected. If a change factor is received, it is multiplied by ideal speed 67 to obtain a new speed 102.

A final check is done on each path before it is selected to be certain that it is active. Data buffer utilization monitor 58 provides another value, the thirty second average 104, expressed in bytes per second, transmitted over the path. A non-zero average 104 indicates that the path is active. New speed calculator 110 examines average 104 and, if it is non-zero, selects that path by delivering a path identifier and a new speed value to a set speed assembler 120.

Each path is evaluated in the above described manner and, for those selected, the new speed 102 is calculated. These speeds 102, which are incoming data rates for each path, are communicated to the upstream node by set speed assembler 120. The upstream node effectuates the new speeds by adjustments to the slot weights, i.e. the maximum number of data bytes included in each path's slot.

To communicate the desired rates to the upstream node, a set speed assembler 120 assembles the desired rates into a special message called a set speed 122.

Referring to FIG. 7, a set speed 122 contains for each selected path a path identifier (path id) 124 and the new speed 102 for that path. Each set speed is broken into fields which alternate between two types; the path ids 124 occupy the first type of field and the new speeds 102 occupy the second.

Set speeds are sent to the upstream node over a control path that is carried on the link.

Each upstream node disassembles each received set speed 122, stores the new speeds 102 in its current speed buffers 71, and reconfigures its outbound scans accordingly.

Other embodiments are within the following claims.

We claim:

1. A system for controlling the flow of data in a communication network of the kind in which a plurality of data streams are sent from an upstream node to a downstream node via a respective plurality of data paths carried on a link connected between said nodes, comprising
    means for said downstream node to specify information concerning permissible speeds of said data streams on the respective paths, and
    means for said upstream node to update the speeds of said plurality of data streams when necessary in response to said information.

2. The system of claim 1 wherein said means to specify comprises
    means for considering when changes in said speeds will be specified by said downstream node, and
    means for identifying data paths whose speeds are to be changed.

3. The system of claim 2 wherein said means for identifying data paths comprise
    means for comparing the previously specified speed of each said path with an ideal speed for said path, and
    means for selecting a data path for a speed change based on said comparison and on said level of buffer utilization.

4. The system of claim 3 wherein said buffer means comprises a plurality of buffers allocated to respective said paths and said means for comparison further bases said ideal speed on the level of buffer utilization of said buffers allocated to a given said path.

5. The system of claim 4 wherein said ideal speed is reduced when the level of buffer utilization of said allocated buffers exceeds a maximum.

6. The system of claim 5 wherein said maximum comprises said allocated buffers containing two seconds worth of data bytes at said ideal speed prior to said reduction.

7. The system of claim 3 wherein said comparison is a ratio and said path is selected for a speed change if said ratio exceeds a threshold that varies with the level of buffer utilization of said buffer.

8. The system of claim 7 wherein said threshold increases with higher utilization levels.

9. The system of claim 7 wherein there is one said threshold that never exceeds unity for speed decreases and a second said threshold that is never less than unity for speed increases.

10. The system of claim 3 wherein said means for specifying further comprises
    means for establishing a new speed equal to said ideal speed times a factor no smaller than unity.

11. The system of claim 3 wherein said factor depends on the level of buffer utilization and higher said factors are associated with lower said levels of buffer utilization.

12. The system of claim 3 wherein said means for comparing bases said ideal speed on the previous speed set for said path by a node further downstream from said downstream node and on the maximum bandwidth available for said path.

13. The system of claim 2 wherein said means for determining comprises
    means for deciding when increases in said speeds should be considered, said decision being based on a level of said buffer utilization and on the interval between a current time and a time when speed increases were previously considered, and
    means for deciding when decreases in said speeds should be considered, said decision being based on said level of buffer utilization and on the interval between a current time and a time when speed decreases were previously considered.

14. The system of claim 13 wherein increases or decreases, respectively, in said speed are considered when the corresponding interval is longer than a predetermined amount of time, the duration of which depends on the level of utilization of said buffer means.

15. The system of claim 14 wherein the duration of said predetermined amount of time for a higher level of buffer utilization in the case of the decision to consider speed increases is longer than the duration of said predetermined amount of time for a higher level of buffer utilization in the case of the decision to consider speed decreases.

16. The system of claim 2 wherein said means for considering bases said considering on a level of said buffer utilization and on the interval between a current time and a time when speed changes were previously considered.

17. The system of claim 1 wherein said information comprises the maximum average speeds of said data streams on the respective paths, and further comprising buffer means in said downstream node for temporarily storing said data streams, said maximum average speeds being specified based on the level of utilization of said buffer means.

18. The system of claim 17 wherein said buffer means comprises a plurality of buffers and said means to specify includes means for measuring said level of buffer utilization as a percentage of said buffers which are being used.

19. The system of claim 1 further comprising
    means for communicating said information from said downstream node to said upstream node.

20. The system of claim 1 wherein said information is the maximum average speeds of said data strams on the respective paths.

21. A system for aiding the control of the flow of data in a communications network having more than two nodes interconnected by links that carry data paths, and in which a data stream is sent from an upstream node to a downstream node on a data path that spans possibly one or more intermediate nodes, comprising
    means for the downstream node and each of said intermediate nodes to specify to an immediately preceding node along said data path information concerning the permissible speed of the data stream on the portion of said path carried by the link from said immediately preceding node, and
    means for said immediately preceding node to update the speed of said data stream when necessary in response to said information, whereby the speed of said data stream on said data path is controlled distributively by said downstream node and said intermediate nodes.

22. A method for controlling the flow of data in a communications network of the kind in which a plurality of data streams are sent respectively via a plurality of data paths from an upstream node to a downstream node, comprising
    the downstream node specifying information concerning permissible speeds of said data streams on the respective paths, and
    said upstream node updating the speeds of said plurality of data streams when necessary in response to said information.

* * * * *